(12) United States Patent
Chen et al.

(10) Patent No.: US 6,753,072 B1
(45) Date of Patent: Jun. 22, 2004

(54) MULTILAYER-BASED MAGNETIC MEDIA WITH HARD FERROMAGNETIC, ANTI-FERROMAGNETIC, AND SOFT FERROMAGNETIC LAYERS

(75) Inventors: Ga-Lane Chen, Fremont, CA (US); Junhua Wu, San Jose, CA (US); Fernando Anaya Chavez, Hayward, CA (US); Simon Wing Tat Fung, Fremont, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/943,753

(22) Filed: Sep. 4, 2001

Related U.S. Application Data

(60) Provisional application No. 60/230,002, filed on Sep. 5, 2000.

(51) Int. Cl.[7] .......................... G11B 5/667; G11B 5/673
(52) U.S. Cl. ................. 428/216; 428/336; 428/694 TS; 428/694 TM
(58) Field of Search ............................. 428/65.3, 65.4, 428/65.5, 692, 694 R, 694 MM, 694 EC, 694 IS, 694 TS, 694 TB, 694 TC, 694 TM, 694 BP, 694 BS, 216, 336; 360/131, 135, 324.11, 324.12, 55, 327.3, 327.32, 327.33, 317; 29/603.8

(56) References Cited

U.S. PATENT DOCUMENTS

| | | |
|---|---|---|
| 4,544,591 A | 10/1985 | Uesaka et al. |
| 4,621,030 A | 11/1986 | Uesaka et al. |
| 4,642,270 A | 2/1987 | Morita et al. |
| 4,666,788 A | 5/1987 | Kadokura et al. |
| 4,675,224 A | 6/1987 | Hosokawa |
| 4,677,032 A | 6/1987 | Robinson |
| 4,687,712 A | 8/1987 | Sugita et al. |
| 4,731,300 A | 3/1988 | Watanabe et al. |
| 4,966,821 A | 10/1990 | Kawashima et al. |
| 5,041,922 A * | 8/1991 | Wood et al. .................. 360/55 |
| 5,543,221 A | 8/1996 | Kitakami et al. |
| 5,576,915 A | 11/1996 | Akiyama et al. |
| 5,589,262 A | 12/1996 | Kiuchi et al. |
| 5,604,030 A | 2/1997 | Yamane et al. |
| 5,648,885 A * | 7/1997 | Nishioka et al. ........ 360/324.12 |
| 5,660,930 A | 8/1997 | Bertero et al. |
| 5,750,270 A * | 5/1998 | Tang et al. .......... 428/694 MM |
| 5,815,342 A | 9/1998 | Akiyama et al. |
| 5,830,590 A | 11/1998 | Gooch et al. |
| 5,834,085 A | 11/1998 | Lairson et al. |
| 5,922,442 A | 7/1999 | Lal et al. |
| 5,946,168 A * | 8/1999 | Hashimoto et al. ....... 360/327.3 |
| 6,020,060 A | 2/2000 | Yoshida et al. |
| 6,083,632 A | 7/2000 | Fujikata et al. |
| 6,143,388 A | 11/2000 | Bian et al. |
| 6,146,775 A | 11/2000 | Fujita et al. |
| 6,153,320 A | 11/2000 | Parkin |
| 6,165,607 A | 12/2000 | Yamanobe et al. |
| 6,168,861 B1 | 1/2001 | Chen et al. |
| 6,183,893 B1 | 2/2001 | Futamoto et al. |
| 6,256,863 B1 * | 7/2001 | Saito et al. .................. 360/317 |
| 6,280,813 B1 * | 8/2001 | Carey et al. .......... 428/694 TM |
| 6,567,246 B1 * | 5/2003 | Sakakima et al. ...... 360/324.11 |

* cited by examiner

Primary Examiner—Stevan A. Resan
(74) Attorney, Agent, or Firm—McDermott, Will & Emery

(57) ABSTRACT

A high areal recording density, perpendicular magnetic recording medium, comprises:
(a) a non-magnetic substrate having a surface with a layer stack formed thereon, the layer stack comprising, in overlying sequence from the substrate surface:
(b) a soft ferromagnetic "keeper" or underlayer;
(c) an anti-ferromagnetic coupling layer structure; and
(d) a hard ferromagnetic perpendicular recording layer including a multilayer magnetic superlattice structure; wherein layers (b), (c), and (d) in stacked combination provide the medium with improved thermal stability and a high perpendicular coercivity which can exceed about 6,500 Oe.

20 Claims, 2 Drawing Sheets

MULTILAYER-BASED MAGNETIC MEDIA WITH HARD FERROMAGNETIC, ANTI-FERROMAGNETIC, AND SOFT FERROMAGNETIC LAYERS

CROSS-REFERENCE TO PROVISIONAL APPLICATION

This application claims priority from U.S. provisional patent application Ser. No. 60/230,002, filed Sep. 5, 2000, the entire disclosure of which is incorporated herein by reference.

FIELD OF THE INVENTION

The present invention relates to multilayer magnetic superlattice-based, perpendicular magnetic recording media which have improved thermal stability and very high perpendicular magnetic coercivities which can exceed about 6,500 Oe. The invention finds particular utility in the manufacture of very high areal recording density magnetic data/information storage and retrieval media such as hard disks and hybrid recording devices and systems including such media in combination with magnetoresistive read heads and inductive write heads.

BACKGROUND OF THE INVENTION

Magnetic recording media and devices incorporating same are widely employed in various applications, particularly in the computer industry for data/information storage and retrieval purposes, typically in disk form. Conventional magnetic thin-film media, wherein a fine-grained polycrystalline magnetic alloy layer serves as the active recording medium layer, are generally classified as "longitudinal" or "perpendicular", depending upon the orientation of the magnetic domains of the grains of magnetic material.

Efforts are continually being made with the aim of increasing the areal recording density, i.e., the bit density, or bits/unit area, of the magnetic media. However, severe difficulties, such as thermal instability, are encountered when the bit density of longitudinal media is increased above about 20–50 Gb/in$^2$ in order to form ultra-high recording density media, when the necessary reduction in grain size exceeds the superparamagnetic limit. Such thermal instability can, inter alia, cause undesirable decay of the output signal of hard disk drives, and in extreme instances, result in total data loss and collapse of the magnetic bits. In this regard, the perpendicular recording media have been found superior to the more common longitudinal media in achieving very high bit densities.

As indicated above, much effort has been directed toward enhancing the density of data storage by both types of magnetic media, as well as toward increasing the stability of the stored data and the ease with which the stored data can be read. For example, it is desirable to develop magnetic media having large magnetic coercivities, $H_c$, since the magnetic moments of such materials require large magnetic fields for reorientation, i.e., switching between digital 1 and 0. Thus, when the magnetic medium has a large coercivity $H_c$, exposure of the magnetic medium to stray magnetic fields, such as are generated during writing operations, is less likely to corrupt data stored at adjacent locations.

The density with which data can be stored within a magnetic thin-film medium for perpendicular recording is related to the perpendicular anisotropy ("Ku" or "$K_1^1$") of the material, which reflects the tendency for the magnetic moments to align in the out-of-plane direction. Thin-film magnetic media having high perpendicular anisotropy have their magnetic moments aligned preferentially perpendicular to the plane of the thin film. This reduces the transition length between the magnetic moments with opposite direction, thereby allowing a larger number of magnetic bits (domains) to be packed into a unit area of the film and increasing the areal density with which data can be stored.

A large perpendicular anisotropy is also reflected in a larger value of the magnetic coercivity $H_c$, since the preferential out-of-plane alignment of the magnetic moments raises the energy barrier for the nucleation of a reverse magnetization domain, and similarly, makes it harder to reverse the orientation of the magnetic domains by 180° rotation. Further, the magnetic remanence of a medium, which measures the tendency of the magnetic moments of the medium to remain aligned once the magnetic field is shut off following saturation, also increases with increasing $K_1$.

While perpendicular media have been fabricated utilizing a single perpendicularly oriented magnetic recording layer, a promising new class of materials for use as the active recording layer of perpendicular magnetic media includes multilayer magnetic "superlattice" structures comprised of a stacked plurality of very thin magnetic/non-magnetic layer pairs, for example, cobalt/platinum $(Co/Pt)_n$ and cobalt/palladium $(Co/Pd)_n$ multilayer stacks. As schematically illustrated in the cross-sectional view of FIG. 1, such multilayer stacks or superlattice structures 10 comprise n pairs of alternating discrete layers of Co or Co-based materials (designated by the letter A in the drawing) and Pt or Pd (designated by the letter B in the drawing), where n is an integer between about 5 and about 50. Superlattice 10 is typically formed by suitable thin film deposition techniques, e.g., sputtering, and can exhibit perpendicular magnetic isotropy arising from metastable chemical modulation in the direction normal to the underlying substrate S on which superlattice 10 is formed. Compared to media with a single layer of conventional cobalt-chromium (Co-Cr) magnetic alloys utilized in magnetic data storage/retrieval disk applications, such $(Co/Pt)_n$ and $(Co/Pd)_n$ multilayer magnetic superlattice structures offer a number of performance advantages. For example, a sputtered $(Co/Pt)_n$ multilayer stack or superlattice 10 suitable for use as a magnetic recording layer of a perpendicular medium can comprise n Co/Pt or Co/Pd layer pairs, where n=about 5 to about 50, e.g., 20, and wherein each Co/Pt layer pair consists of an about 3 Å thick Co layer adjacent to an about 10 Å thick Pt or Pd layer, for a total of 40 separate (or discrete) layers, and are characterized by having a large perpendicular anisotropy, high coercivity $H_c$, and a high squareness ratio of a magnetic hysteresis (M-H) loop measured in the perpendicular direction. By way of illustration, $(Co/Pt)_n$ and $(Co/Pd)_n$ multilayer magnetic superlattices, wherein n=about 10 to about 30 and the layer pairs have thicknesses as indicated above and fabricated, e.g., by means of techniques disclosed in U.S. Pat. No. 5,750,270, the entire disclosure of which is incorporated herein by reference, have stable magnetic domains with a narrow domain wall width, the stability of the Co/Pt and Co/Pd domains being enhanced by a strong domain wall pinning effect. Thus, $(Co/Pt)_n$ and $(Co/Pd)_n$ multilayer superlattice structures for use in the fabrication of magneto-optical ("MO") recording media, perpendicular recording media, and/or magnetoresistance ("MR") recording media exhibit perpendicular anisotropies exceeding about 2×10$^6$ erg/cm$^3$; coercivities as high as about 5,000 Oe; squareness ratios (S) of a M-H loop, measured in the perpendicular direction, of from about 0.85 to about 1.0, and carrier-to-noise ratios ("CNR") of from about 30 dB to about 60 dB.

Multilayer superlattice-based structures provide a number of additional advantages vis-à-vis conventional thin-film magnetic media. For example, by virtue of their small magnetic domain diameters, they can advantageously support high areal recording densities (e.g., ~100–600 Gb/in² at domain diameters<20 nm); they can be configured either in MR or MO type drives or employed in the form of "hybrid" recording devices including magnetoresistive or giant magnetoresistive ("GMR") read heads (see below) and inductive write heads; and the read-back signal can be differentiated, whereby the sharp rise-time of the differentiated signal further facilitates high areal density recording.

A key advance in magnetic recording technology which has brought about very significant increases in the data storage densities of magnetic disks has been the development of extremely sensitive magnetic read/write devices which utilize separate magnetoresistive read heads and inductive write heads. The magnetoresistive effect, wherein a change in electrical resistance is exhibited in the presence of a magnetic field, has long been known; however, utilization of the effect in practical MR devices was limited by the very small magnetoresistive response of the available materials. The development in recent years of materials and techniques (e.g., sputtering) for producing materials which exhibit much larger magnetoresistive responses, such as Fe-Cr multilayers, has resulted in the formation of practical read heads based upon what is termed the giant magnetoresistive effect, or "GMR". Further developments in GMR-based technology have resulted in the formation of GMR-based head structures, known as GMR "spin valve" heads, which advantageously do not require a strong external magnet or magnetic field to produce large resistance changes, and can detect weak signals from tiny magnetic bits.

The use of such GMR-based spin valve heads can significantly increase the areal density of magnetic recording media and systems by increasing the track density, as expressed by the number of tracks per inch ("TPI") and the linear density, as expressed by the number of bits per inch ("BPI"), where areal density=TPI×BPI. Currently, GMR-based spin valve heads are utilized for obtaining areal recording densities of more than about 10 Gb/in²; however, even greater recording densities are desired. A difficulty encountered with further increase in the BPI of conventional magnetic recording media is that the smaller grain sizes necessary for increase in the BPI results in thermal instability of the media due to exceeding the superparamagnetic limit.

As indicated supra, sputtered multilayer magnetic superlattice structures can provide several advantages vis-à-vis conventional thin-film magnetic recording media, when utilized in fabricating very high areal density media. Specifically, multilayer magnetic superlattice magnetic recording media exhibit higher interfacial (i.e., perpendicular) anisotropy (Ku or $K_\perp$) than conventional thin film media, e.g., greater values of KuV/kT (where Ku=anisotropy constant; V=volume in cm³; k=Boltzmann's constant; and T=absolute temperature, °K); increased thermal stability; and very high values of perpendicular coercivity $H_c$, i.e., >10³ Oe. In this regard, the very high values of $H_c$ attainable with multilayer magnetic superlattice structures translates into a significant increase in BPI, and thus a substantial increase in areal recording density. In order to satisfactorily perform write operations on such high coercivity media, it is necessary that the material of the write head have a high saturation magnetic moment ($B_{sat}$), which is preferably three (3) times that of the coercivity $H_c$, i.e., from about 12,000 to about 30,000 Gauss for $H_c$ in the range of from about 4,000 to about 10,000 Oe, with a strong inductive flux. The high $B_{sat}$ material is also utilized for an underlying soft magnetic ("keeper") layer of the medium. Materials such as NiFe, CoNiFe, CoZrNb, FeTaC, FeCoB, and FeAlN are usable for this purpose, with FeAlN being preferred in view of its very high value of $B_{sat}$.

Multilayer magnetic superlattice structures utilized in magnetic recording media can have either an ordered structure forming a true superlattice, or a disordered structure, variously termed a "non-superlattice multilayer" or a "pseudo-superlattice structure". In $(Co/Pt)_n$ and $(Co/Pd)_n$ multilayer superlattice structures having utility in high areal recording density media, the interfaces between the Co and Pt (or Pd) layers incur surface interactions, such as for example, spin-orbit coupling. Because Co and Pt (or Pd) have different electronic shell structures or configurations, spin-orbit coupling occurs between the spin and orbital motions of the electrons. When an external magnetic field is applied for reorienting the spin of an orbiting electron, the orbit is also reoriented. However, because the orbit is strongly coupled to the metal lattice, the spin axis of the electron resists rotation. The energy required for reorienting (i.e., rotating) the spin system of a magnetic domain away from the easy direction is termed the anisotropy energy. The stronger the spin-orbit coupling or interaction, the higher the anisotropy energy and the coercivity $H_c$.

It is believed that an increase in the interfacial anisotropy of $(Co/Pt)_n$ and $(Co/Pd)_n$ multilayer magnetic superlattice structures, as by an increase in the disorder or "broken symmetry" at each of the Co/Pt or Co/Pd interfaces, can result in the obtainment of very high perpendicular magnetic coercivities $H_c$ necessary for fabricating ultra-high areal density, thermally stable magnetic recording media, i.e., perpendicular coercivities on the order of about $10^4$ Oe. It is further believed that the amount or degree of disorder or "broken symmetry" at each of the Co/Pt or Co/Pd interfaces of sputtered $(Co/Pt)_n$ and $(Co/Pd)_n$ superlattices can be increased by substituting the conventionally employed Ar sputtering gas with a higher atomic weight sputtering gas, e.g., Kr or Xe, thereby providing bombardment of the deposited films with ionized particles having greater momentum, resulting in a greater amount of lattice disruption, disorder, and/or "broken symmetry" at the layer interfaces, as disclosed in U.S. Pat. No. 5,106,703 to Carcia, the entire disclosure of which is incorporated herein by reference.

Referring again to FIG. 1, according to conventional practices for forming multilayer magnetic superlattice structures 10 in the fabrication of magnetic recording (MR) media, a layer of a "soft" magnetic material, i.e., where $H_c$<1 Oe (alternatively referred to as a "keeper" or underlayer), and at least one overlying thin layer, termed a "seed layer", typically comprising at least one material selected from Pt, Pd, Ag, Au, Rh, Ir, Cu, and Mn, are interposed between the substrate S and the "hard" multilayer magnetic superlattice structure 10 (i.e., where $H_c$>4,000 Oe) for, inter alia, performing writing operations and enhancing/controlling the crystallographic texture and grain size/structure of the latter.

A frequently encountered problem in the preparation of multilayer magnetic superlattice structures for use in large scale, automated fabrication of very high recording density magnetic media for use in, e.g., hybrid recording systems utilizing GMR heads, is difficulty in reliably and controllably achieving a desired interfacial anisotropy of the magnetic superlattice, hence a desired high thermal stability and perpendicular magnetic coercivity $H_c$.

Accordingly, there exists a need for improved perpendicular magnetic recording media, which media are based on multilayer magnetic superlattice structures (as described supra), which exhibit very high and readily controllable perpendicular magnetic coercivities $H_c$, i.e., from at least about 4,000 Oe to greater than about 6,500 Oe, by methodology which can be easily and readily implemented in a cost-effective manner for fabrication of very high areal recording density media. Further, there exists a need for improved perpendicular media having very high areal recording densities and improved thermal stability for use in hybrid recording systems, which media can be fabricated in an economical fashion utilizing conventional automated manufacturing equipment.

The present invention is based upon the discovery that effective regulation and control of the perpendicular magnetic coercivity $H_c$ of multilayer magnetic superlattice structures for use as recording layers in high areal density perpendicular magnetic recording media, such as described supra, at $H_c$ values of from at least about 4,000 Oe to greater than about 6,500 Oe, can be accomplished by forming (as by sputtering) on a suitable substrate a multilayer structure, termed a "HAS" structure, which HAS structure is comprised, in sequence, of (1) a "hard" ("H") ferromagnetic recording layer (i.e., $H_c$>4,000 Oe, as previously defined), which may be of single or multilayer superlattice construction; (2) an anti-ferromagnetic ("A") coupling layer structure; and (3) a "soft" ("S") magnetic "keeper" or underlayer (i.e., $H_c$<1 Oe, as previously defined) formed on the substrate, which soft underlayer material has a very high value of $B_{sat}$. Moreover, the improved perpendicular magnetic media of the present invention exhibit very high areal recording densities along with improved thermal stability, and thus are suitable for use in hybrid recording systems, while maintaining full compatibility with all technological aspects of conventional magnetic recording media. Further, the methodology provided by the present invention enjoys diverse utility in the manufacture of all manner of films, devices, and products requiring multilayer magnetic thin film coatings and structures exhibiting very high values of perpendicular anisotropy and magnetic coercivity with good thermal stability.

DISCLOSURE OF THE INVENTION

An advantage of the present invention is a multilayer magnetic superlattice-based perpendicular magnetic recording medium having improved thermal stability and perpendicular magnetic coercivity.

Another advantage of the present invention is an improved, high areal recording density perpendicular magnetic recording density.

Yet another advantage of the present invention is a high areal recording density, multilayer magnetic superlattice-based, perpendicular magnetic recording medium including anti-ferromagnetically coupled soft magnetic "keeper" and hard magnetic recording layers.

Still another advantage of the present invention is a perpendicular magnetic recording medium having improved thermal stability and high perpendicular coercivity which can exceed about 6,500 Oe.

Additional advantages and other features of the present invention will be set forth in the description which follows and in part will become apparent to those having ordinary skill in the art upon examination of the following or may be learned from the practice of the present invention. The advantages of the present invention may be realized and obtained as particularly pointed out in the appended claims.

According to one aspect of the present invention, the foregoing and other advantages are obtained in part by a high areal recording density, perpendicular magnetic recording medium, comprising:

(a) a non-magnetic substrate having a surface with a layer stack formed thereon, the layer stack comprising, in overlying sequence from the substrate surface:

(b) a soft ferromagnetic "keeper" or underlayer;

(c) an anti-ferromagnetic coupling layer structure; and (d) a hard ferromagnetic perpendicular recording layer including a multilayer magnetic superlattice structure; wherein layers (b), (c), and (d) in stacked combination provide the medium with improved thermal stability and a high perpendicular coercivity which can exceed about 6,500 Oe.

In accordance with embodiments of the present invention, the medium further comprises:

(e) an adhesion layer between the surface of the non-magnetic substrate and the soft ferromagnetic underlayer;

(f) a seed layer between the soft ferromagnetic underlayer and the anti-ferromagnetic coupling layer structure;

(g) a protective overcoat layer over the hard ferromagnetic perpendicular recording layer; and (h) a lubricant topcoat over the protective overcoat layer.

According to embodiments of the present invention, the non-magnetic substrate (a) comprises a non-magnetic material selected from the group consisting of Al, Al-based alloys, NiP-plated Al, other non-magnetic metals, other non-magnetic metal alloys, glass, ceramics, glass-ceramics, polymers, and laminates and composites thereof; the soft magnetic underlayer (b) is from about 1,500 to about 5,000 Å thick, has a saturation moment $B_{sat}$ as high as about 30,000 Gauss, and comprises a material selected from the group consisting of NiFe, CoNiFe, CoZrNb, FeTaC, FeCoB, and FeAlN; and the anti-ferromagnetic coupling layer structure (c) comprises a layer stack composed of at least one ferromagnetic layer of Co and at least one anti-ferromagnetic layer of Ru, i.e., the anti-ferromagnetic coupling layer structure (c) comprises a layer stack selected from the group consisting of Co/Ru, Ru/Co/Ru, and Ru/Co/Ru/Co layer stacks, wherein each Co layer is about 3 Å thick and each Ru layer is from about 8 to about 10 Å thick.

According to specific embodiments of the present invention, the hard ferromagnetic perpendicular recording layer (d) comprises a stacked multilayer superlattice structure comprising n Co-based magnetic/Pd- or Pt-based non-magnetic layer pairs, where n is an integer between from about 5 to about 50, each Co-based magnetic layer is from about 3 to about 5 Å thick, each Pd- or Pt-based non-magnetic layer is from about 7 to about 10 Å thick, and the superlattice structure is selected from the group consisting of $(Co/Pd)_n$, $(Co/Pt)_n$; $(CoCrX/Pd)_n$, where X=Ta, B, Mo or Pt; and $(CoCrX/Pt)_n$, where X=Ta, B, Mo or Pt.

In accordance with further embodiments of the present invention, the adhesion layer (e) has a thickness of from about 25 to about 50 Å and comprises a material selected from the group consisting of Cr and Ti; the seed layer (f) comprises a Ta/ITO layer pair wherein the thickness of each of the Ta and ITO layers is about 5 nm; or the seed layer (f) comprises an about 3 to about 50 Å thick layer of a material selected from the group consisting of Pd, Pt, Si, and SiN; the protective overcoat layer (g) is from about 25 to about 60 Å thick and comprises a wear-resistant material selected from the group consisting of diamond-like carbon ("DLC"); sputtered a-C:H, a-C:HN, and a-C:N; ion beam deposited carbon ("IBD-C"); cathodic arc-deposited carbon ("CAD-C"); SiN, AlN, SiC, SiN/C, AlN/C, and SiC/C; and the lubricant topcoat layer (h) is from about 3 to about 30 Å thick and comprises a high molecular weight fluoropolyether or perfluoropolyether.

According to another aspect of the present invention, a high areal recording density, perpendicular magnetic recording medium, comprises:

(a) a non-magnetic substrate having a surface with a layer stack formed thereon, the layer stack comprising, in overlying sequence from the substrate surface:

(b) a soft ferromagnetic "keeper" or underlayer, the soft magnetic underlayer (b) being from about 1,500 to about 5,000 Å thick, having a saturation moment $B_{sat}$ as high as about 30,000 Gauss, and comprising a material selected from the group consisting of NiFe, CoNiFe, CoZrNb, FeTaC, FeCoB, and FeAlN$_x$, (c) an anti-ferromagnetic coupling layer structure, the anti-ferromagnetic coupling layer structure (c) comprising a layer stack composed of at least one ferromagnetic layer of Co and at least one anti-ferromagnetic layer of Ru, the layer stack being selected from the group consisting of Co/Ru, Ru/Co/Ru, and Ru/Co/Ru/Co layer stacks, wherein each Co layer is about 3 Å thick and each Ru layer is from about 8 to about 10 Å thick; and (d) a hard ferromagnetic perpendicular recording layer comprised of a multilayer magnetic superlattice structure;

wherein layers (b), (c), and (d) in stacked combination provide the medium with improved thermal stability and a high perpendicular coercivity which can exceed about 6,500 Oe.

In accordance with specific embodiments of the present invention, the hard ferromagnetic perpendicular recording layer (d) comprises a stacked multilayer in the form of a superlattice structure comprising n Co-based magnetic/Pd- or Pt-based non-magnetic layer pairs, where n is an integer between from about 5 to about 50, each Co-based magnetic layer is from about 3 to about 5 Å thick, each Pd- or Pt-based non-magnetic layer is from about 7 to about 10 Å thick, and the superlattice structure is selected from the group consisting of $(Co/Pd)_n$; $(Co/Pt)_n$; $(CoCrX/Pd)_n$, where X=Ta, B, Mo or Pt; and $(CoCrX/Pt)_n$, where X=Ta, B, Mo or Pt.

According to further embodiments of the present invention, the medium further comprises:

(e) an adhesion layer between the surface of the non-magnetic substrate and the soft ferromagnetic underlayer;

(f) a seed layer between the soft ferromagnetic underlayer and the anti-ferromagnetic coupling layer structure;

(g) a protective overcoat layer over the hard ferromagnetic perpendicular recording layer; and (h) a lubricant topcoat over the protective overcoat layer.

In accordance with specific embodiments of the present invention, the adhesion layer (e) has a thickness of from about 25 to about 50 Å and comprises a material selected from the group consisting of Cr and Ti; the seed layer (f) comprises a Ta/ITO layer pair wherein the thickness of each of the Ta and ITO layers is about 5 nm; or the seed layer (f) comprises an about 3 to about 50 Å thick layer of a material selected from the group consisting of Pd, Pt, Si, and SiN; the protective overcoat layer (g) is from about 25 to about 60 Å thick and comprises a wear-resistant material selected from the group consisting of diamond-like carbon ("DLC"); sputtered a-C:H, a-C:HN, and a-C:N; ion beam deposited carbon ("IBD-C"); cathodic arc-deposited carbon ("CAD-C"); SiN, AlN, SiC, SiN/C, AlN/C, and SiC/C; and the lubricant topcoat layer (h) is from about 3 to about 30 Å thick and comprises a high molecular weight fluoropolyether or perfluoropolyether.

Still another aspect of the present invention is a perpendicular magnetic recording medium, comprising:

a non-magnetic substrate having a surface with a layer stack formed thereon; and means for providing anti-ferromagnetic coupling between a soft ferromagnetic "keeper" or underlayer and a hard ferromagnetic, multilayer superlattice-based, perpendicular recording layer of the layer stack.

According to embodiments of the present invention, the medium further comprises:

an adhesion layer between the surface of the non-magnetic substrate and the soft ferromagnetic "keeper" or underlayer; and a seed layer between the soft ferromagnetic "keeper" or underlayer and the means for providing anti-ferromagnetic coupling;

a protective overcoat layer over the hard ferromagnetic perpendicular recording layer; and a lubricant topcoat layer over the protective overcoat layer.

In accordance with embodiments of the present invention, the hard ferromagnetic perpendicular recording layer comprises a multilayer magnetic superlattice structure including n Co-based magnetic/Pd- or Pt-based non-magnetic layer pairs, where n is an integer between from about 5 to about 50, each Co-based magnetic layer is from about 3 to about 5 Å thick, each Pd- or Pt-based non-magnetic layer is from about 7 to about 10 Å thick, and the superlattice structure is selected from the group consisting of $(Co/Pd)_n$; $(Co/Pt)_n$; $(CoCrX/Pd)_n$, where X=Ta, B, Mo or Pt; and $(CoCrX/Pt)_n$, where X=Ta, B, Mo or Pt.

Additional advantages and aspects of the present invention will become readily apparent to those skilled in the art from the following detailed description, wherein embodiments of the present invention are shown and described, simply by way of illustration of the best mode contemplated for practicing the present invention. As will be described, the present invention is capable of other and different embodiments, and its several details are susceptible of modification in various obvious respects, all without departing from the spirit of the present invention. Accordingly, the drawings and description are to be regarded as illustrative in nature, and not as limitative.

BRIEF DESCRIPTION OF THE DRAWINGS

The following detailed description of the embodiments of the present invention can best be understood when read in conjunction with the following drawings, in which like reference numerals are employed throughout to designate similar features, wherein layer thicknesses are not necessarily drawn to scale but rather are drawn as to best illustrate the features of the present invention, wherein.

DESCRIPTION OF THE INVENTION

The present invention is based upon the discovery that perpendicular magnetic recording media, e.g., suitable for use in hybrid recording devices and systems (i.e., including a magnetorestrictive read head and an inductive write head), and based upon magnetic superlattice structures, e.g., $(Co/Pt)_n$ and $(Co/Pd)_n$ superlattices, having improved thermal stability and very high perpendicular magnetic coercivities $H_c$ (i.e., from at least about 4,000 to greater than about 6,500 Oe), and thus capable of very high areal recording densities (i.e., 100–600 Gbits/in$_2$), can be reliably and controllably fabricated by providing, in sequence, on a suitable non-magnetic substrate: (1) a soft ("S") ferromagnetic "keeper" or underlayer; (2) an anti-ferromagnetic ("A") coupling layer structure; and (3) a hard ("H") ferromagnetic perpendicular recording layer including a multilayer magnetic superlattice structure. Alternatively, the layer sequence according to the invention may be viewed in reverse order (i.e., from distal to proximal with respect to the substrate), as forming a "HAS" layer structure. Advantageously, each of the above layers of the inventive recording media, as well as additional seed and protective overcoat layers, may be readily formed in cost-effective manner by conventional thin film deposition techniques, methodologies, and instrumentalities, e.g., sputtering.

Figure 1:
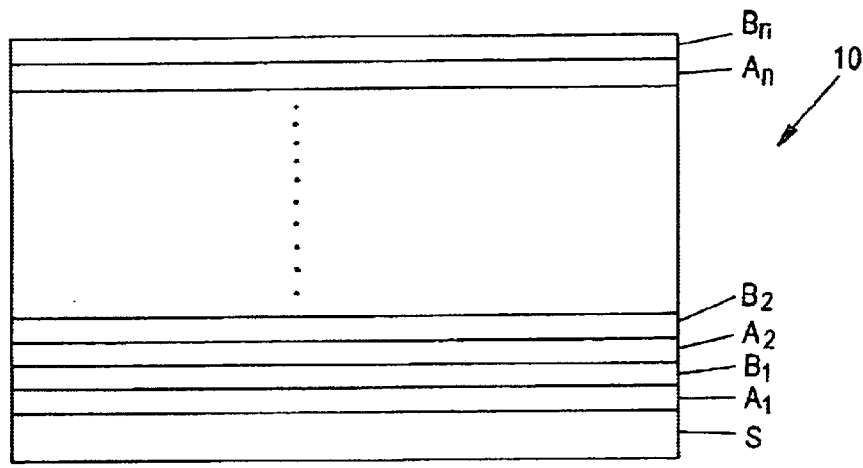
FIG. 1 illustrates, in simplified, schematic, cross-sectional view, a $(Co\text{-based}/Pt)_n$ or $(Co\text{-based}/Pd)_n$ multilayer magnetic superlattice structure according to the present invention.
Figure 2:
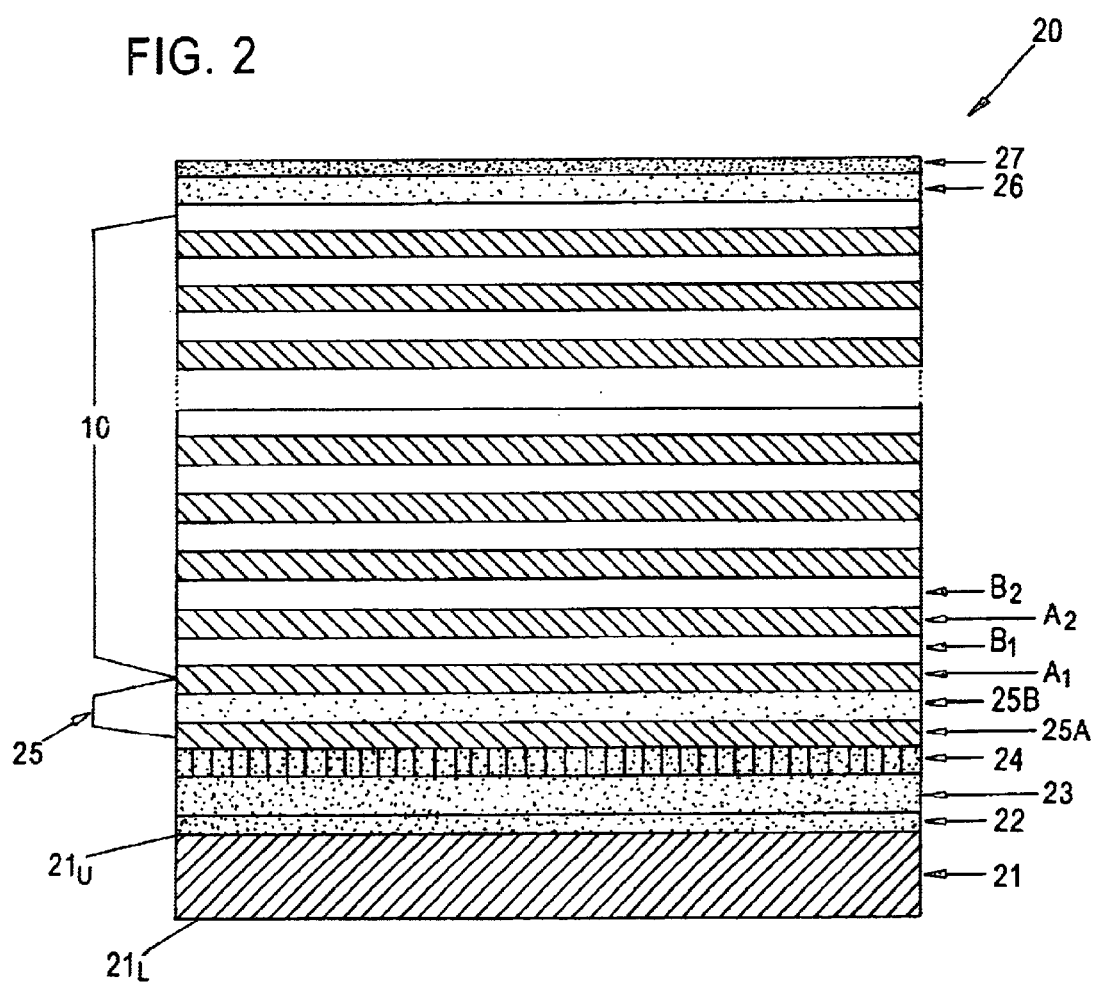
FIG. 2 illustrates, in simplified, schematic, cross-sectional view, a perpendicular magnetic recording medium according to the present invention, comprising a soft ferromagnetic "keeper" or underlayer, an anti-ferromagnetic coupling layer structure, and a hard ferromagnetic perpendicular recording layer in the form of a multilayer magnetic superlattice structure as in FIG. 1.

Referring now to FIG. 2, shown therein in schematic, cross-sectional view, is a generalized representation of a very high areal recording density, perpendicular type magnetic recording medium 20 of "HAS" structure according to the invention and suitable for use in hybrid recording devices/systems, comprising a multilayer magnetic superlattice structure 10 of the type illustrated in FIG. 1 and described supra. It is understood that the various layers depicted in the figure as sequentially formed on the upper surface $21_U$ of substrate 21 (as depicted in FIG. 2) are typically also formed in the same sequence on the lower surface $21_L$. However, for illustrative convenience, the embodiment depicted in FIG. 2 illustrates the various layers constituting the HAS structure as deposited only on the upper surface $21_U$.

According to the invention, the magnetic superlattice structure 10 exhibits a very high and controllable value of perpendicular magnetic coercivity $H_c$ (e.g., from at least about 4,000 Oe to as high as about 6,500 Oe), a squareness ratio S of from greater than about 0.8 to about 1.0 for a magnetic hysteresis M-H loop measured in the perpendicular direction, and improved thermally stability.

As illustrated, perpendicular recording medium 20 includes a non-magnetic substrate 21 comprised of a non-magnetic material selected from among Al, Al-based alloys, NiP-plated Al, other non-magnetic metals, other non-magnetic metal alloys, glass, ceramics, glass-ceramics, polymers, and laminates and composites of the aforementioned materials. The thickness of substrate 21 is not critical; however in the case of media utilized in hard disk applications, substrate 21 must be of a thickness sufficient to provide a necessary rigidity. Substrate 21 includes a suitably polished or otherwise smoothened upper surface $21_U$, on which the layer stack constituting the medium 20 is formed.

The above-mentioned layer stack comprises, in sequence from the substrate upper surface 21A: (a) an adhesion layer (22) of, e.g., Cr or Ti, from about 25 to about 50 Å thick, preferably about 30 Å thick; (b) a "keeper" or underlayer 23 of a soft ferromagnetic material from about 1,500 to about 5,000 Å thick, preferably about 2,000 Å thick, comprising a material having a high saturation magnetic moment $B_{sat}$ as high as about 30,000 Gauss, selected from among NiFe, CoNiFe, CoZrNb, FeTaC, FeCoB, and FeAlN, with FeAlN being preferred in view of its very high saturation magnetic moment $B_{sat}$; (c) a thin seed layer 24 from about 3 to about 50 Å thick, preferably about 20 Å thick, of at least one material selected from the group consisting of Pd, Pt, Si, and SiN, or a Ta/ITO layer pair, wherein the thickness of each of Ta and ITO layers is about 5 nm; (d) an anti-ferromagnetic coupling layer structure 25 in the form of a layer stack comprised of at least one ferromagnetic layer 25A and at least one anti-ferromagnetic layer 25B, e.g., at least one Co ferromagnetic layer from about about 2.5 to about 4 Å thick, typically about 3 Å thick, and at least one Ru anti-ferromagnetic layer from about 8 to about 10 Å thick, typically about 8 Å thick, selected from among Co/Ru, Ru/Co/Ru, and Ru/Co/Ru/Co layer stacks; (e) a hard ferromagnetic multilayer magnetic superlattice structure 10 (similar to that shown in FIG. 1) and comprising a vertically stacked plurality of n magnetic/non-magnetic layer pairs $A_1B_1, A_2B_2 \ldots A_nB_n$, where n is an integer from about 5 to about 50, e.g., from about 10 to about 30, each magnetic layer A of each layer pair being from about 3 to about 5 Å thick, preferably about 3 Å thick, and comprising a Co-based magnetic material selected from among Co, CoCr, and CoX, where X is selected from Ta, B, Mo and Pt, and each non-magnetic layer B of each layer pair being from about 7 to about 10 Å thick, preferably about 10 Å thick, and comprising a Pd- or Pt-based non-magnetic material; (f) a protective overcoat layer 26 from about 25 to about 60 Å thick, e.g., about 50 Å thick, and comprising a wear-resistant material selected from the group consisting of diamond-like carbon ("DLC"), sputtered a-C:H, a-CHN, and a-C:N, ion beam-deposited carbon ("IBD-C"), cathodic arc-deposited carbon ("CAD-C"), SiN, AlN, SiC, SiN/C, AlN/C, and SiC/C; and (g) a lubricant topcoat layer 27 over the protective overcoat layer 26, having a thickness of from about 3 to about 30 Å, e.g., about 20–25 Å thick, and comprised of a high molecular weight fluoropolymer or perfluoropolymer material, e.g., HMW Z-Dol, MMW Z-Dol, Z-Tetraol, AM 2001, and PFPE (each available from Ausimont, Thorofare, NJ).

Conventional techniques, such as sputtering, CVD, and/or PVD, may be employed for depositing each of the adhesive layer 22, high $B_{sat}$, soft ferromagnetic keeper or underlayer 23, thin seed layer 24, anti-ferromagnetic coupling layer structure 25, hard ferromagnetic multilayer superlattice structure 10, and protective overcoat layer 26, while the lubricant topcoat layer 27 can be deposited by any of a variety of conventional techniques, such as dipping, spraying, etc. For example, the lubricant can be applied by dipping the substrate with layer stack formed thereon in a 0.2–0.3% solution of the lubricant in a suitable solvent. The bonded lubricant ratio can be enhanced, as is known, by performing a post-dipping oven or UV-catalyzed curing process. Tape burnishing/wiping may also be performed for reducing surface particles and enhancing (i.e., lowering) glide height of the read/write heads/transducers, as well as for enhancement of tribological performance.

According to the invention, multilayer magnetic superlattice structures 10 can be reliably and controllably deposited, as by use of conventional or segmented target sputtering techniques (described below), so as to exhibit a predetermined (i.e., desired) perpendicular magnetic coercivity $H_c$, by successively depositing (as by sputtering) the adhesion layer 22, the high $B_{sat}$ soft ferromagnetic keeper or underlayer 23, and seed layer 24, over the substrate surface 21A, and then sputtering the multilayer magnetic superlattice structure 10 thereover in an atmosphere comprising at least one sputtering gas selected from pure Ar, pure Kr, pure Xe, and mixtures thereof with $N_2$ or $O_2$, with the sputtering gas atmosphere being present at at least a predetermined minimum pressure of about 3 mTorr. According to the invention, the sputter deposition of the multilayer magnetic superlattice structure is performed with either DC or RF excitation, utilizing at least a pair of sputtering targets respectively comprised of magnetic and non-magnetic materials (such as described supra) which are alternately energized. Both constant energy and constant power mode energization is possible according to the present invention. For example, sputtering energies of each target may be in the range of from about 5 J to about 3,500 J, whereas sputtering power applied to each target may be from about 10 W to about 4,000 W. Deposition intervals can be controlled to within 100 millisec. The substrate is not supplied with additional heat during sputtering and thus is at ambient temperature.

Figure 3:
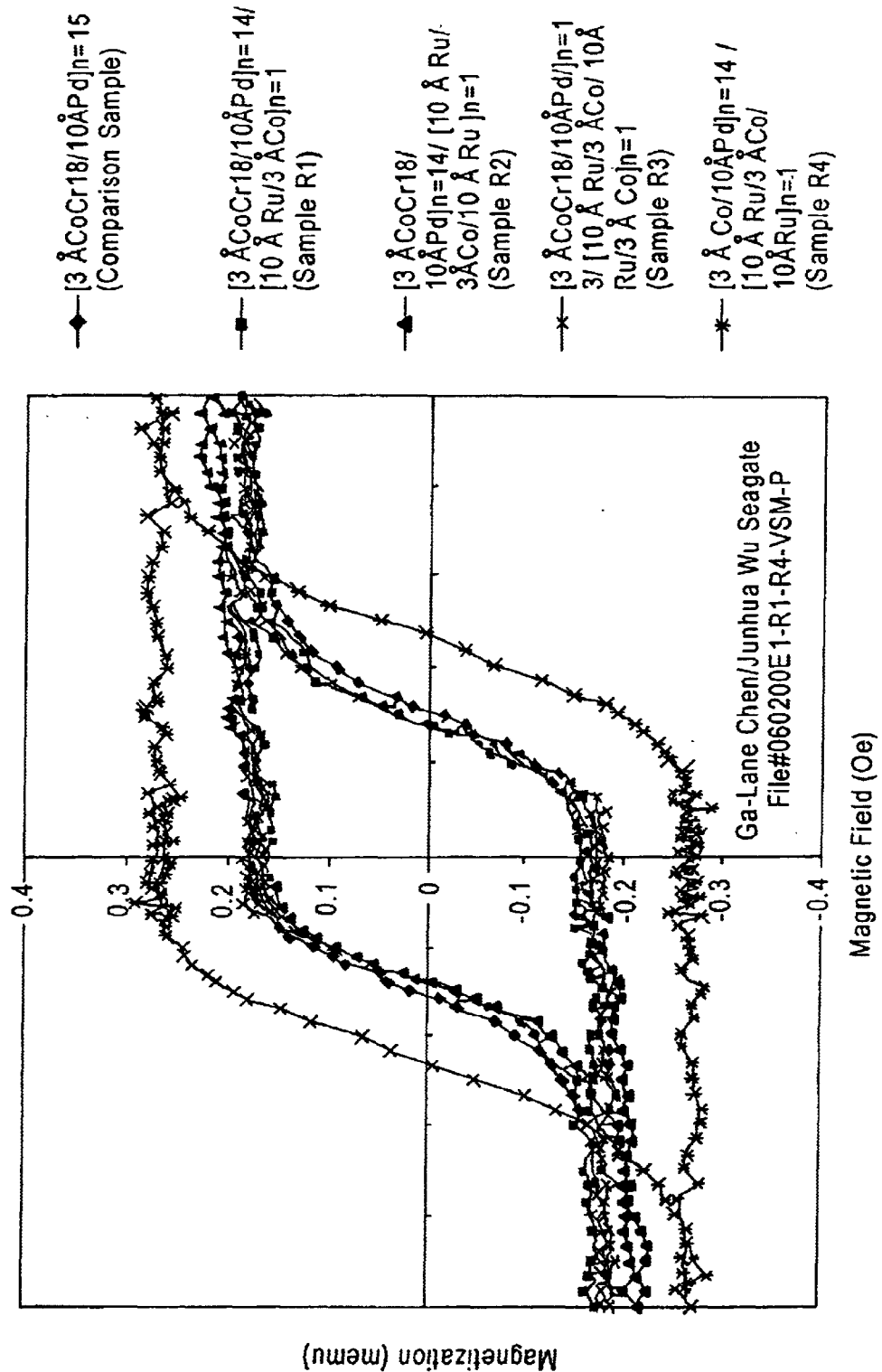
FIG. 3 is a graph illustrating M-H curves showing the effect of anti-ferromagnetic layers on the perpendicular anisotropy of multilayer magnetic superlattice structures.

A series of multilayer magnetic superlattice-based media embodying a layer stack of HAS structure as shown in FIG. 2 were fabricated by means of sputtering, wherein in each sample the seed layer 24 comprised 50 Å layers of ITO and Ta sputtered in an argon atmosphere at about 30 mTorr, and the multilayer superlattice structure 10 constituting the hard magnetic layer was formed by sputtering in an argon atmosphere at about 30 mTorr, and comprised 14 pairs of 3 Å thick CoCr18 and 10 Å thick Pd layers (samples R1–R3) or 14 pairs of 3 Å thick Co and 10 Å thick Pd layers (sample R4). Sample R1 included a Co/Ru anti-ferromagnetic coupling layer structure 25 comprised of 3 Å thick Co and 8–10 Å thick Ru layers; samples R2 and R4 included a Ru/Co/Ru anti-ferromagnetic coupling layer structure 25 comprised of 10 Å thick Ru layers sandwiching a 3 Å thick Co layer, and sample R3 included a Ru/Co/Ru/Co anti-ferromagnetic coupling layer structure 25 comprised of a pair of 10 Å thick Ru layers and a pair of 3 Å thick Co layers. Similarly structured media with 10, 13, and 15 CoCr18/Pd layer pairs, but without the anti-ferromagnetic coupling layer structure 25 of the present invention, were fabricated under similar sputtering conditions, for comparison purposes. M-H hysteresis curves obtained for each of samples R1–R4 and the comparison sample (each measured in the perpendicular direction) are shown in FIG. 3. Magnetic coercivities $H_c$ of samples R1–R4 containing the anti-ferromagnetic coupling layer structure according to the present invention, and measured in the perpendicular direction, were in each case above about 4,000 Oe and ranged to above about 6,500 Oe (in particular, 6,934 Oe for sample R4); the magnetic remanence-thickness product (Mrt) ranged from about 0.277 to 0.420; the coercive squareness (S*) ranged from about 0.463 to about 0.548; and the squareness ratio (S) ranged from about 0.826 to very close to unity (i.e., 0.997), each of which ranges of values were generally improved vis-à-vis corresponding ranges obtained for the comparison samples. Moreover, according to the invention, the squareness of the multilayer magnetic superlattice structures 10 can be readily controlled by appropriate selection of layer composition and sputtering gas pressure.

Thus, the present invention advantageously provides improved, high quality, thermally stable, multilayer magnetic superlattice structures suitable for use in, e.g., hybrid recording devices/systems, and having readily controllable, very high values of perpendicular magnetic coercivity $H_c$. As a consequence, the inventive methodology facilitates reliable, cost-efficient fabrication of thermally stable perpendicular magnetic recording media having very high areal recording densities on the order of about 100–600 Gb/in$^2$ and hybrid devices and systems utilizing such improved multilayer magnetic superlattice structures as the active recording layer. Moreover, the inventive methodology can be practiced in a cost-effective manner utilizing automated manufacturing technology and equipment for large-scale manufacture of magnetic recording media, such as hard disks. Finally, the invention is not limited to use with hard disk substrates but rather is broadly applicable to the formation of high magnetic coercivity multilayer magnetic superlattice structures for use in all manner of devices and products.

In the previous description, numerous specific details are set forth, such as specific materials, structures, processes, etc., in order to provide a better understanding of the present invention. However, the present invention can be practiced without resorting to the details specifically set forth herein. In other instances, well-known processing techniques and structures have not been described in order not to unnecessarily obscure the present invention.

Only the preferred embodiments of the present invention and but a few examples of its versatility are shown and described in the present disclosure. It is to be understood that the present invention is capable of use in various other combinations and environments and is susceptible of changes and/or modifications within the scope of the inventive concept as expressed herein.

What is claimed is:

1. A high areal recording density, perpendicular magnetic recording medium, comprising:
    (a) a non-magnetic substrate having a surface with a layer stack formed thereon, said layer stack comprising, in overlying sequence from said substrate surface:
    (b) a soft ferromagnetic underlayer;
    (c) an anti-ferromagnetic coupling layer structure; and
    (d) a hard ferromagnetic perpendicular recording layer including a multilayer magnetic superlattice structure;
        wherein layers (b), (c), and (d) in stacked combination provide said medium with improved thermal stability and a high perpendicular coercivity which can exceed about 6,500 Oe.

2. The medium according to claim 1, further comprising:
    (e) an adhesion layer between said surface of said non-magnetic substrate and said soft ferromagnetic underlayer; and
    (f) a seed layer between said soft ferromagnetic underlayer and said anti-ferromagnetic coupling layer structure.

3. The medium according to claim 2, further comprising:
    (g) a protective overcoat layer over said hard ferromagnetic perpendicular recording layer; and
    (h) a lubricant topcoat over said protective overcoat layer.

4. The medium according to claim 1, wherein:
    said non-magnetic substrate (a) comprises a non-magnetic material selected from the group consisting of (Al), Al-based alloys, NiP-plated Al, other non-magnetic metals, other non-magnetic metal alloys, glass, ceramics, glass-ceramics, polymers, and laminates and composites thereof.

5. The medium according to claim 1, wherein:
said soft magnetic underlayer (b) is from about 1,500 to about 5,000 Å thick, has a saturation moment $B_{sat}$ as high as about 30,000 Gauss, and comprises a material selected from the group consisting of NiFe, CoNiFe, CoZrNb, FeTaC, FeCoB, and FeAlN$_x$.

6. The medium according to claim 1, wherein:
said anti-ferromagnetic coupling layer structure (c) comprises a layer stack composed of at least one ferromagnetic layer of Co and at least one anti-ferromagnetic layer of Ru.

7. The medium according to claim 6, wherein:
said anti-ferromagnetic coupling layer structure (c) comprises a layer stack selected from the group consisting of Co/Ru, Ru/Co/Ru, and Ru/Co/Ru/Co layer stacks, wherein each Co layer is about 3 Å thick and each Ru layer is from about 8 to about 10 Å thick.

8. The medium according to claim 1, wherein:
said hard ferromagnetic perpendicular recording layer (d) comprises a stacked multilayer in the form of a magnetic superlattice structure comprising n Co-based magnetic/Pd- or Pt-based non-magnetic layer pairs, where n is an integer between from about 5 to about 50, each Co-based magnetic layer is from about 3 to about 5 Å thick, each Pd- or Pt-based non-magnetic layer is from about 7 to about 10 Å thick, and said superlattice structure is selected from the group consisting of (Co/Pd)$_n$; (Co/Pt)$_n$; (CoCrX/Pd)$_n$, where X=Ta, B, Mo or Pt; and (CoCrX/Pt)$_n$, where X=Ta, B, Mo or Pt.

9. The medium according to claim 2, wherein:
said adhesion layer (e) has a thickness of from about 25 to about 50 Å and comprises a material selected from the group consisting of Cr and Ti; and
said seed layer (f) comprises a Ta/ITO layer pair wherein the thickness of each of the Ta and ITO layers is about 5 nm; or said seed layer (f) comprises an about 3 to about 50 Å thick layer of a material selected from the group consisting of Pd, Pt, Si, and SiN.

10. The medium according to claim 3, wherein:
said protective overcoat layer (g) is from about 25 to about 60 Å thick and comprises a wear-resistant material selected from the group consisting of diamond-like carbon ("DLC"); sputtered a-C:H, a-C:HN, and a-C:N; ion beam deposited carbon ("IBD-C"); cathodic arc-deposited carbon ("CAD-C"); SiN, AlN, SiC, SiN/C, AlN/C, and SiC/C; and
said lubricant topcoat layer (h) is from about 3 to about 30 Å thick and comprises a high molecular weight fluoropolyether or perfluoropolyether.

11. A high areal recording density, perpendicular magnetic recording medium, comprising:
(a) a non-magnetic substrate having a surface with a layer stack formed thereon, said layer stack comprising, in overlying sequence from said substrate surface:
(b) a soft ferromagnetic underlayer, said soft magnetic underlayer (b) being from about 1,500 to about 5,000 Å thick, having a saturation moment $B_{sat}$ as high as about 30,000 Gauss, and comprising a material selected from the group consisting of NiFe, CoNiFe, CoZrNb, FeTaC, FeCoB, and FeAlN$_x$,
(c) an anti-ferromagnetic coupling layer structure, said anti-ferromagnetic coupling layer structure (c) comprising a layer stack composed of at least one ferromagnetic layer of Co and at least one anti-ferromagnetic layer of Ru, said layer stack being selected from the group consisting of Co/Ru, Ru/Co/Ru, and Ru/Co/Ru/Co layer stacks, wherein each Co layer is about 3 Å thick and each Ru layer is from about 8 to about 10 Å thick; and
(d) a hard ferromagnetic perpendicular recording layer including a multilayer magnetic superlattice structure;
wherein layers (b), (c), and (d) in stacked combination provide said medium with improved thermal stability and a high perpendicular coercivity which can exceed about 6,500 Oe.

12. The medium according to claim 11, wherein:
said hard ferromagnetic perpendicular recording layer (d) comprises a stacked multilayer in the form of a superlattice structure comprising n Co-based magnetic/Pd- or Pt-based non-magnetic layer pairs, where n is an integer between from about 5 to about 50, each Co-based magnetic layer is from about 3 to about 5 Å thick, each Pd- or Pt-based non-magnetic layer is from about 7 to about 10 Å thick, and said superlattice structure is selected from the group consisting of (Co/Pd)$_n$; (Co/Pt)$_n$; (CoCrX/Pd)$_n$, where X=Ta, B, Mo or Pt; and (CoCrX/Pt)$_n$, where X=Ta, B, Mo or Pt.

13. The medium according to claim 11, further comprising:
(e) an adhesion layer between said surface of said non-magnetic substrate and said soft ferromagnetic underlayer; and
(f) a seed layer between said soft ferromagnetic underlayer and said anti-ferromagnetic coupling layer structure.

14. The medium according to claim 13, further comprising:
(g) a protective overcoat layer over said hard ferromagnetic perpendicular recording layer; and
(h) a lubricant topcoat over said protective overcoat layer.

15. The medium according to claim 13, wherein:
said adhesion layer (e) has a thickness of from about 25 to about 50 Å and comprises a material selected from the group consisting of Cr and Ti; and
said seed layer (f) comprises a Ta/ITO layer pair wherein the thickness of each of the Ta and ITO layers is about 5 nm; or said seed layer (f) comprises an about 3 to about 50 Å thick layer of a material selected from the group consisting of Pd, Pt, Si, and SiN.

16. The medium according to claim 14, wherein:
said protective overcoat layer (g) is from about 25 to about 60 Å thick and comprises a wear-resistant material selected from the group consisting of diamond-like carbon ("DLC"); sputtered a-C:H, a-C:HN, and a-C:N; ion beam deposited carbon ("IBD-C"); cathodic arc-deposited carbon ("CAD-C"); SiN, AlN, SiC, SiN/C, AlN/C, and SiC/C; and
said lubricant topcoat layer (h) is from about 3 to about 30 Å thick and comprises a high molecular weight fluoropolyether or perfluoropolyether.

17. A perpendicular magnetic recording medium, comprising:
a non-magnetic substrate having a surface with a layer stack formed thereon; and
means for providing anti-ferromagnetic coupling between a soft ferromagnetic underlayer and a hard ferromagnetic, multilayer superlattice-based, perpendicular recording layer of said layer stack.

18. The medium according to claim 17, further comprising:
- an adhesion layer between said surface of said non-magnetic substrate and said soft ferromagnetic underlayer; and
- a seed layer between said soft ferromagnetic underlayer and said means for providing anti-ferromagnetic coupling.

19. The medium according to claim 17, further comprising:
- a protective overcoat layer over said hard ferromagnetic perpendicular recording layer; and
- a lubricant topcoat layer over said protective overcoat layer.

20. The medium according to claim 17, wherein:
said hard ferromagnetic perpendicular recording layer comprises a multilayer magnetic superlattice structure comprising n Co-based magnetic/Pd- or Pt-based non-magnetic layer pairs, where n is an integer between from about 5 to about 50, each Co-based magnetic layer is from about 3 to about 5 Å thick, each Pd- or Pt-based non-magnetic layer is from about 7 to about 10 Å thick, and said superlattice structure is selected from the group consisting of $(Co/Pd)_n$; $(Co/Pt)_n$; $(CoCrX/Pd)_n$, where X=Ta, B, Mo or Pt; and $(CoCrX/Pt)_n$, where X=Ta, B, Mo or Pt.

* * * * *